(12) United States Patent
Iizuka et al.

(10) Patent No.: US 9,147,098 B2
(45) Date of Patent: Sep. 29, 2015

(54) IMAGE PROCESSING APPARATUS, IMAGE PROCESSING METHOD, AND COMPUTER PROGRAM STORAGE MEDIUM

(75) Inventors: Yoshio Iizuka, Yokohama (JP); Yukio Sakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1119 days.

(21) Appl. No.: 12/350,355

(22) Filed: Jan. 8, 2009

(65) Prior Publication Data

US 2009/0175519 A1 Jul. 9, 2009

(30) Foreign Application Priority Data

Jan. 9, 2008 (JP) ................................ 2008-002615

(51) Int. Cl.
*G06K 9/00* (2006.01)
*G06T 7/00* (2006.01)

(52) U.S. Cl.
CPC ............... *G06K 9/00* (2013.01); *G06T 7/0028* (2013.01); *G06T 2207/10116* (2013.01); *G06T 2207/20101* (2013.01); *G06T 2207/30061* (2013.01)

(58) Field of Classification Search
CPC ................... G06K 9/00; G06T 7/0028; G06T 2207/10116; G06T 2207/20101; G06T 2207/30061
USPC ......... 382/128, 130, 131, 132, 284, 294, 298, 382/299
See application file for complete search history.

(56) References Cited

U.S. PATENT DOCUMENTS

| | | | | |
|---|---|---|---|---|
| 5,359,513 A | * | 10/1994 | Kano et al. | 382/128 |
| 5,974,165 A | * | 10/1999 | Giger et al. | 382/132 |
| 6,058,322 A | * | 5/2000 | Nishikawa et al. | 600/408 |
| 6,067,373 A | * | 5/2000 | Ishida et al. | 382/130 |
| 6,904,163 B1 | * | 6/2005 | Fujimura et al. | 382/131 |
| 6,915,003 B2 | * | 7/2005 | Oosawa | 382/130 |
| 2002/0012478 A1 | * | 1/2002 | Thirion et al. | 382/294 |
| 2005/0025387 A1 | * | 2/2005 | Luo | 382/298 |
| 2005/0259891 A1 | * | 11/2005 | Sendai | 382/294 |
| 2006/0078183 A1 | * | 4/2006 | deCharms | 382/128 |
| 2007/0160276 A1 | * | 7/2007 | Chen et al. | 382/128 |
| 2008/0159607 A1 | * | 7/2008 | Littmann | 382/128 |

FOREIGN PATENT DOCUMENTS

| | | | |
|---|---|---|---|
| JP | 10-234727 A | | 9/1998 |
| JP | 2002-263101 A | | 9/2002 |
| JP | 2004-313551 A | | 11/2004 |
| JP | 2006-181146 | | 7/2006 |
| JP | 2007-054636 A | | 3/2007 |
| WO | WO 2007/058632 | * | 5/2007 |

* cited by examiner

*Primary Examiner* — Arnold Kinkead
*Assistant Examiner* — Richard Tan
(74) *Attorney, Agent, or Firm* — Canon U.S.A. Inc., IP Division (57) ABSTRACT

An image processing apparatus has an obtaining unit configured to obtain a region from a medical image, and a generating unit configured to generate a display image by superimposing, on the basis of a position being in a schema image and corresponding to the region, an image of the region on a diagram representing a human body structure.

11 Claims, 8 Drawing Sheets

IMAGE PROCESSING APPARATUS, IMAGE PROCESSING METHOD, AND COMPUTER PROGRAM STORAGE MEDIUM

BACKGROUND OF THE INVENTION

1. Field of the Invention

The present invention generally relates to an image processing apparatus, an image processing method, and a computer program, used for the display of a schema.

2. Description of the Related Art

Before medical documents such as charts and image diagnostic reports were made electronically available, doctors used to draw a schema by hand on a paper-based medical document. The term "schema" generally refers to a "diagrammatic illustration" or "sketch". In the field of medicine, however, the term "schema" refers to a diagram representing a structure of a predetermined part of a human body. In recent years, medical information systems, such as a hospital information system (HIS) and a picture archiving and communication system (PACS), have become increasingly widespread. As these medical information systems have become widespread, medical documents are gradually being made electronically available. That is, medical support apparatuses capable of using information equipment to electronically generate and display medical documents (e.g., charts and image diagnostic reports) that otherwise used to be drawn by hand by doctors, are beginning to be used, which apparatuses are further capable of communicating with other medical information systems.

During generation of an electronic medical document, text can typically be relatively easily input using a keyboard. Also, graphics of many shapes can be drawn by manipulating an input device, such as a mouse or tablet. Then, loci drawn by manipulating such an input device can be input as line drawing information. However, generation of a schema typically involves drawing of a human body structure having a fairly complex shape, and thus cannot be easily made using a mouse or tablet.

Accordingly, a medical support apparatus may store many templates of schema images (hereinafter each such template is referred to as a "basic schema") in advance, and allow a doctor to select a basic schema therefrom. After selecting a basic schema, the doctor draws, on the selected basic schema, a simple graphic representing an affected area. Thus, a schema can be relatively easily generated thereby.

Japanese Patent Laid-Open No. 2006-181146 proposes a technique in which a shape of an anatomic structure (e.g., an organ) of a subject is estimated from a medical image, and the estimated shape is compared with a shape of an anatomic structure represented by a basic schema. When a doctor specifies a position of an affected area on the medical image, the corresponding position on the basic schema can be displayed. Thus, a graphic representing the affected area can be drawn at an appropriate position on the basic schema.

The proposed technique allows easy use of a schema on an electronic chart. The use of a schema may be advantageous in that a positional relationship between a body part and an affected area can be clearly presented to the doctor. However, there may be a disadvantage in that since information about the affected area can only be presented as a simple graphic, it may be difficult to obtain detailed information about the affected area from the schema.

With the technique described in Japanese Patent Laid-Open No. 2006-181146, when a doctor specifies a position of an affected area on a medical image, the corresponding position on a basic schema can be displayed. Therefore, the affected area can be drawn relatively accurately only in terms of the position of the affected area. However, this technique may only allow a position specified on a medical image by a doctor to be displayed on a schema, and may not allow detailed information about an affected area to be presented to the doctor.

Detailed information about an affected area may be recorded as a medical image (e.g., roentgen image, X-ray computerized tomography (CT) image, positron emission tomography (PET) image, or single photon emission computed tomography (SPECT) image). Since a basic schema is an image that is not dependent on a specific patient, a medical image and a basic schema are given as different images. Therefore, when a doctor wants to obtain detailed information about an affected area, it may be necessary to refer to the medical image separately from the basic schema. However, if the doctor refers to the medical image and the basic schema separately, it may not be possible to take advantage of the schema to clearly present a positional relationship between a body part and an affected area to the doctor.

SUMMARY OF THE INVENTION

According to an aspect of the present invention, there is provided an image processing apparatus including an obtaining unit configured to obtain a region from a medical image; and a generating unit configured to generate a display image by superimposing, on the basis of a position being in a schema image and corresponding to the region, an image of the region on a diagram representing a human body structure.

According to another aspect of the present invention, there is provided an image processing apparatus including a selecting unit configured to select a schema image of a body part and a medical image of the body part; an extracting unit configured to extract, in both the selected schema image and medical image, feature points for identifying a structure of the body part; a calculating unit configured to calculate a geometric correspondence between the feature points extracted in the schema image and the corresponding feature points extracted in the medical image; a modifying unit configured to modify the schema image on the basis of the calculated geometric correspondence such that a positional relationship between feature points in the schema image corresponds to a positional relationship between feature points in the medical image; and a superimposing unit configured to generate a composite image by superimposing, on the basis of the geometric correspondence, the medical image or part of the medical image on the schema image modified by the modifying unit.

Further features of the present invention will become apparent from the following description of exemplary embodiments with reference to the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain principles of the invention.

DESCRIPTION OF THE EXEMPLARY EMBODIMENTS

An image processing apparatus and a method for controlling the image processing apparatus according to exemplary embodiments of the present invention will now be described in detail with reference to the accompanying drawings. The scope of the present invention is not limited to that illustrated in the drawings. In the exemplary embodiments described below, an image processing apparatus of the present invention may be used as a medical support apparatus.

Figure 1:
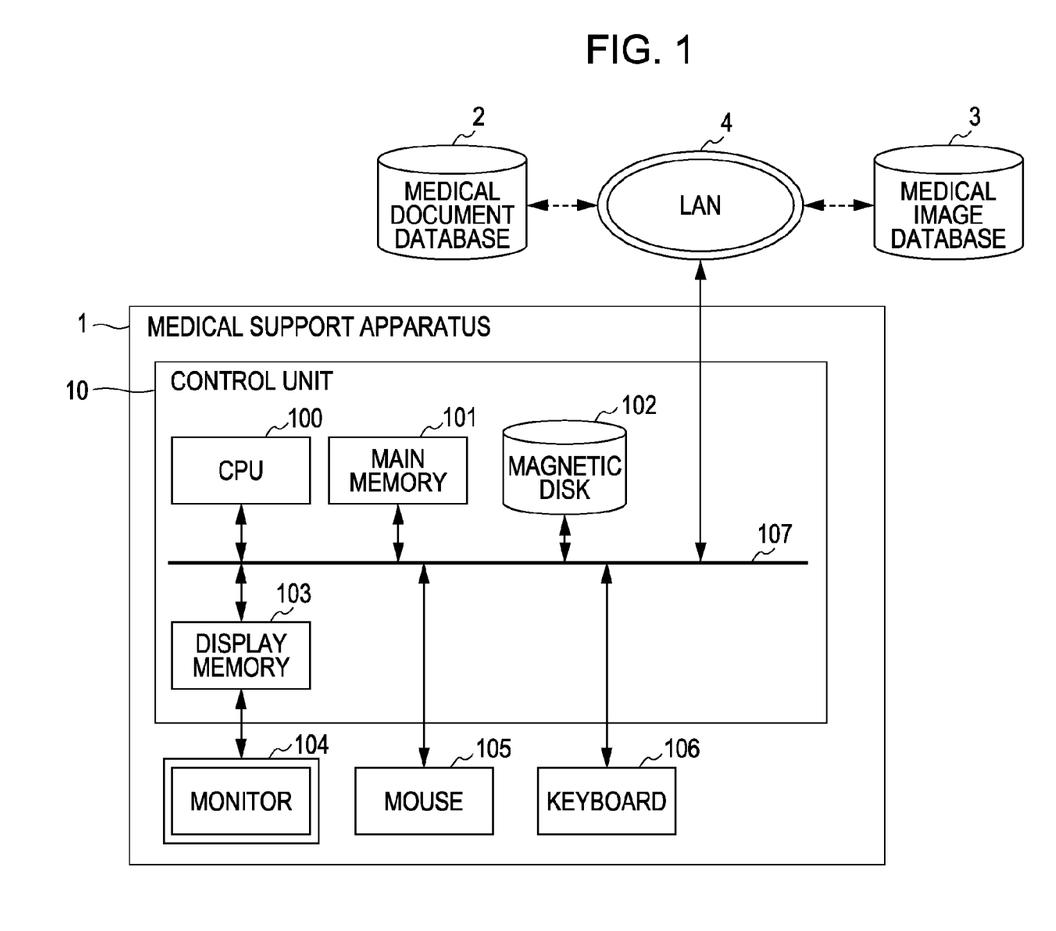
FIG. 1 illustrates a configuration of a medical support apparatus according to a first exemplary embodiment of the present invention.

FIG. 1 illustrates a configuration of a medical support apparatus according to a first exemplary embodiment of the present invention. Referring to the embodiment shown in FIG. 1, a medical support apparatus 1 includes a control unit 10, a monitor 104, a mouse 105, and a keyboard 106. The control unit 10 includes a central processing unit (CPU) 100, a main memory 101, a magnetic disk 102, a display memory 103, and a common bus 107. When the CPU 100 executes a program stored in the main memory 101, communication with a medical document database 2 and a medical image database 3 and various control operations, such as control of the overall operation of the medical support apparatus 1 and the like, are executed.

The CPU 100 controls the operation of components of the medical support apparatus 1. The main memory 101 stores control programs executed by the CPU 100, and provides a work area for program execution of the CPU 100. The magnetic disk 102 stores an operating system (OS), device drivers for peripherals, various application software programs including a program for performing medical support processing and the like, as described below, and data of many basic schemata. The display memory 103 temporarily stores display data for the monitor 104. The monitor 104 may be, for example, a cathode-ray tube (CRT) monitor or a liquid crystal monitor. The monitor 104 displays images on the basis of data from the display memory 103. The mouse 105 and the keyboard 106 are provided for the user to perform a pointing input operation and a character input operation, respectively. The common bus 107 connects the above-described components such that they can communicate with one another.

In the present exemplary embodiment, the medical support apparatus 1 reads out medical document data, such as electronic charts and image diagnostic reports, from the medical document database 2 via a local area network (LAN) 4. Additionally, the medical support apparatus 1 reads out various types of medical image data from the medical image database 3 via the LAN 4. Alternatively, the medical support apparatus 1 may read out medical document data or medical image data from an external storage device connected to the medical support apparatus 1. Examples of the external storage device include a floppy disk drive (FDD), a hard disk drive (HDD), a compact disk (CD) drive, a digital versatile disk (DVD) drive, a magneto-optical (MO) drive, and a ZIP drive.

Examples of types of medical images may include, but are not limited to, a plain X-ray image (roentgen image), an X-ray CT image, a magnetic resonance imaging (MRI) image, a PET image, a SPECT image, and an ultrasound image.

Figure 2:
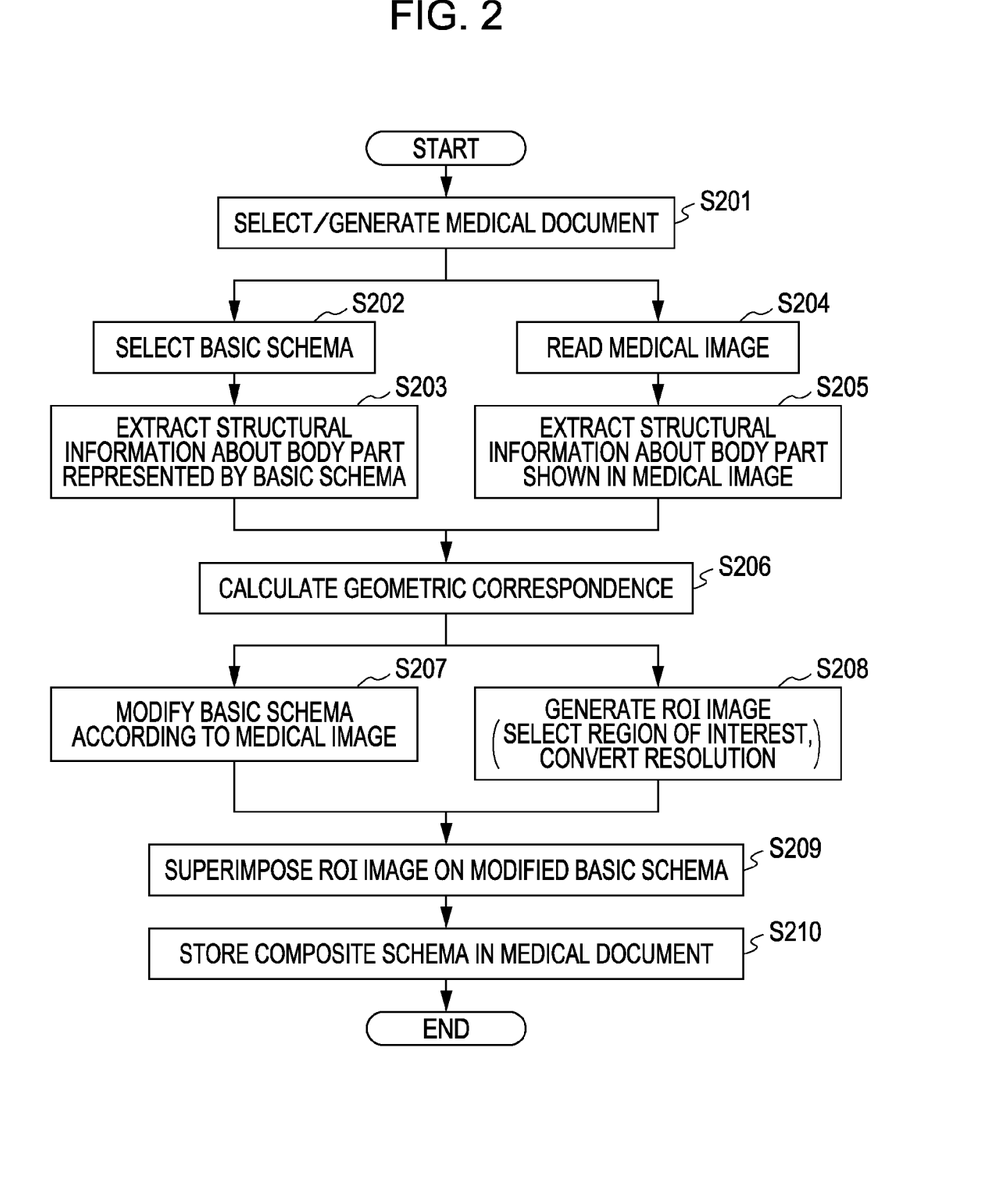
FIG. 2 is a flowchart illustrating an example of a processing procedure in the medical support apparatus of the first exemplary embodiment.

With reference to the flowchart of FIG. 2, a description will be provided for an example of how the control unit 10 can control the medical support apparatus 1. FIG. 2 is a flowchart illustrating an example of a processing procedure in the medical support apparatus 1 of the first exemplary embodiment. The processing illustrated by the flowchart may be realized when the CPU 100 executes a program stored in the main memory 101. In the processing example described below, a doctor may operate the mouse 105 or keyboard 106 to input various commands to the medical support apparatus 1. In the processing example described below, the status and result of execution of the program executed by the CPU 100 are displayed on the monitor 104 by the OS and a function of a display program that are separately executed by the CPU 100.

In step S201, in accordance with a command input by the doctor, the CPU 100 selects a medical document from among a group of medical documents generated in the past and writes the selected medical document to the main memory 101, or generates a new medical document in the main memory 101. The selection of a medical document can be realized when the CPU 100 communicates with the medical document database 2 via the common bus 107 and LAN 4 and receives a medical document from the medical document database 2. Alternatively, the selection of a medical document can be realized when the CPU 100 reads out a medical document from an external storage device connected to the medical support apparatus 1.

Hereinafter, processing will be described for drawing a schema on the medical document written to the main memory 101 in step S201. In other words, processing will be described for writing data constituting a schema at a predetermined position in medical document data.

In step S202, the CPU 100 reads out data of many basic schemata stored in the magnetic disk 102 and displays a list of the basic schemata on the monitor 104. The displayed list may either be a list of identifiers of the respective basic schemata, or a list of thumbnails of the respective basic schemata. The list of the basic schemata may be hierarchically divided into groups and displayed sequentially from the top hierarchy list. When the doctor selects a basic schema from the list of the basic schemata displayed on the monitor 104, the CPU 100 writes data of the selected basic schema to the main memory 101.

Figure 3:
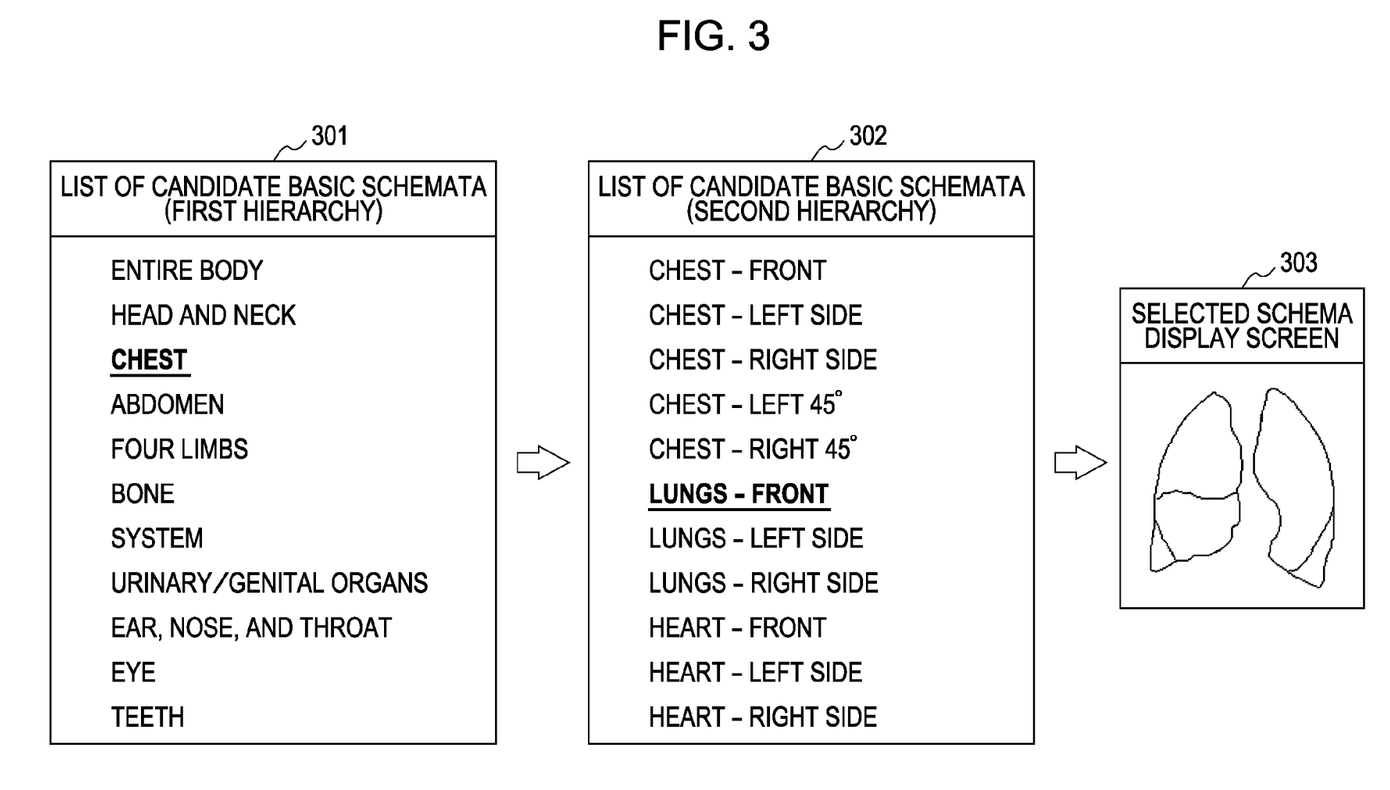
FIG. 3 illustrates an example where lists of basic schemata are hierarchically displayed in the first exemplary embodiment.

FIG. 3 illustrates an example where lists of basic schemata are hierarchically displayed. For simple representation of a plurality of hierarchical lists, FIG. 3 illustrates lists of identifiers only. In practice, however, lists of thumbnails may also be presented to the doctor. First, on the monitor 104, the medical support apparatus 1 displays a first list display screen 301 presenting a list of candidate basic schemata in the first hierarchy, and thus prompts the doctor to select one of the candidate basic schemata (e.g., chest).

Next, on the monitor 104, the medical support apparatus 1 displays a second list display screen 302 presenting a list of candidate basic schemata in the second hierarchy belonging to the selected group (chest), and again prompts the doctor to select one of the candidate basic schemata (e.g., lungs—front). If there are the third and following hierarchies, the same procedure may be repeated. A basic schema selected by the doctor from a display screen presenting a list of candidates in the lowest hierarchy is the basic schema that is ultimately selected. A selected schema display screen 303 displays an image of the basic schema selected as described above.

Referring back to FIG. 2, the description of the flowchart is continued. In step S203, the CPU 100 extracts structural information about a body part represented by the basic schema. It may be necessary that this structural information be extracted similarly from both the basic schema and the medical image.

Figure 4:
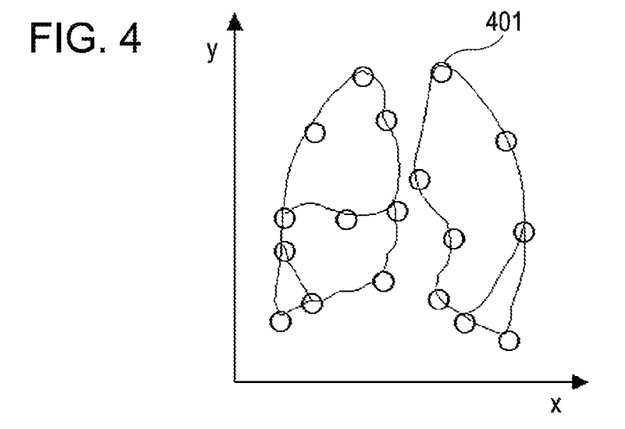
FIG. 4 is a diagram for explaining an example where characteristic points (feature points) on outlines of a body part represented by a basic schema are used as structural information about the body part in the first exemplary embodiment.

FIG. 4 is a diagram for explaining an example where characteristic points (feature points) on outlines of a body part represented by a basic schema are used as structural information about the body part. It will be understood that although lungs are illustrated as an example of the body part in FIG. 4, an example of the body part is not intended to be limited thereto. The graphic of lungs in FIG. 4 is given only as an example, and the structure of the basic schema is not limited to only that illustrated in FIG. 4.

In FIG. 4, the feature points are indicated by circles 401. Each of the feature points can be extracted, for example, as a branch point on the outline, or as a point at which the curvature of the outline is maximized. In the present exemplary embodiment, coordinates of each feature point, such as those illustrated in FIG. 4, can be used as structural information about a body part.

There are several different methods for extracting structural information about a body part represented by a basic schema. For example, in one method, during generation of a basic schema, structural information about a body part is given in advance as attribute information about the basic schema. In this method, the structural information about the body part can be extracted by reading out the information given in advance as attribute information. This method improves processing efficiency, because it may not be necessary to calculate structural information every time it is to be extracted.

Also, in another method, in a hierarchical list of basic schemata, the position of a body part or the orientation (e.g., front, left side, or right side) of an anatomic structure and body part may be identified from the name of a group to which the basic schema belongs or from an identifier assigned to the basic schema.

Additionally, other methods may involve automatically extracting structural information about a body part. In one method, a scale-invariant feature transform (SHIFT) feature value is determined (see, D. G. Lowe, "Object recognition from local scale-invariant features", Proc. of IEEE International Conference on Computer Vision (ICCV), pp. 1150-1157, 1999). In another method, a principal component analysis (PCA)-SHIFT feature value is calculated by a CPU (see, Y. Ke, R. Sukthankar, "PCA-SHIFT: A more distinctive representation for local image descriptors", Proc. of IEEE Conference on Computer Vision and Pattern Recognition (CVPR), pp. 511-517, 2004).

Referring back to FIG. 2, the description of the example shown in the flowchart is continued. In step S204, the CPU 100 writes to the main memory 101 a medical image associated with the medical document. Since the medical image is stored in the medical image database 3, the CPU 100 receives the medical image from the medical image database 3 via the common bus 107 and LAN 4. Alternatively, if a medical image is stored in an external storage device connected to the medical support apparatus 1, the CPU 100 retrieves the medical image from the external storage device.

If the medical image is a three-dimensional image, or is constituted by a plurality of two-dimensional images, the CPU 100 selects an image corresponding to the orientation (e.g., front, left side, or right side) of the body part represented by the basic schema selected in step S202.

The orientation of the body part represented by the basic schema is extracted in step S203 as part of the structural information about the body part. If the medical image is a three-dimensional image, after the orientation of the body part is determined, the orientation of the image's cross section, such as an axial cross section, a coronal cross section, or a sagittal cross section, may be determined.

However, in a three-dimensional image, even if the orientation of the image's cross section is determined, there may still be a plurality of cross-sectional images. Thus, a cross-sectional image that best or better shows an affected area may be selected from among the plurality of cross-sectional images. For example, a cross-sectional image that best or better shows an affected area may be selected by receiving the selection of a specific cross-sectional image from the doctor. Alternatively, if the shape, size, and distribution of brightness of an affected area are already known to some extent, an image processing filter for emphasizing the already known information may be applied to the medical image. Then, by applying a threshold to the thus emphasized medical document, the affected area can be extracted automatically.

In step S205, the CPU 100 extracts structural information about a body part shown in the medical image. The structural information about the body part shown in the medical image may be information that can be compared with the structural information about the body part represented by the basic schema.

As in the case of the method for extracting the structural information about the body part represented by the basic schema, there are several different methods for extracting the structural information about the body part shown in the medical image. For example, in one method, the medical image is displayed on the monitor 104, and designation of feature points on the outline of the body part shown in the medical image are received from the doctor. The feature points designated by the doctor may be located at positions corresponding to the respective feature points (e.g., circles 401) on the outline of the basic schema illustrated in FIG. 4.

Figure 5:
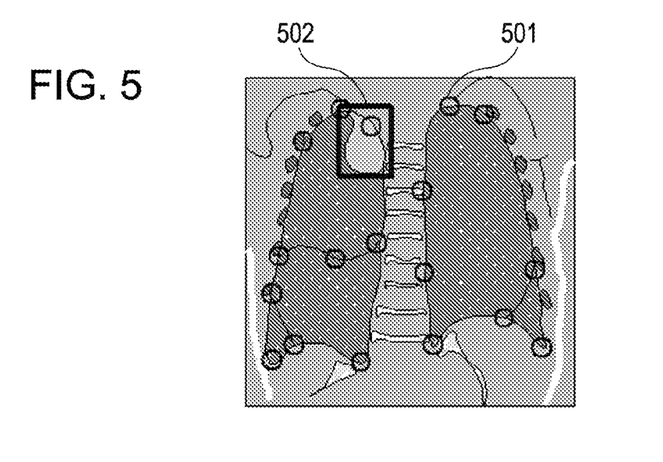
FIG. 5 illustrates an example of a medical image on which designation of feature points is received in the first exemplary embodiment.

An example of the medical image on which designation of feature points is received is illustrated in FIG. 5. In FIG. 5, circles 501 indicating feature points are arranged on the outline of a body part (e.g., lungs) in a cross-sectional image.

As another method for extracting structural information about the body part shown in the medical image, the CPU 100 may automatically calculate the above-described SHIFT feature value or PCA-SHIFT feature value on the basis of the medical image.

In step S206 of the flowchart shown in FIG. 2, the CPU 100 compares the structural information extracted in step S203 with the structural information extracted in step S205 to calculate a geometric correspondence therebetween. That is, in step S206, the CPU 100 compares the structural information about the body part represented by the basic schema with the structural information about the body part shown in the medical image to calculate a geometric correspondence therebetween. Here, the coordinates of feature points, SHIFT feature value, or PCA-SHIFT feature value described above as examples of structural information can constitute vector information including a plurality of components. Therefore, processing performed in step S206 may be to find a pair of vector information items corresponding to each other between the basic schema and the medical image.

In this processing, an inter-vector distance between one item of vector information about the basic schema and one item of vector information about the medical image is calculated. Thus, of all pairs of vectors, the pair of vectors having the smallest distance therebetween, can be obtained. However, if the distance between the vectors is larger than a predetermined threshold value, it is determined that there is no pair of vectors corresponding to each other. As a way of reducing errors in finding corresponding vectors, it may be possible to put several neighboring vectors together and deal with them as a higher-dimensional vector. In this case, an inter-vector distance between a higher-dimensional vector of the basic schema and a higher-dimensional vector of the medical image is calculated.

In step S207, the CPU 100 modifies the basic schema on the basis of the geometric correspondence obtained in step S206. That is, the CPU 100 modifies the image of the basic schema such that the positions of the respective feature points on the basic schema become closer to those of the corresponding feature points on the medical image. This image modification technique is called "registration", which has been variously studied. For example, "Medical Image Registration (The BIOMEDICAL ENGINEERING Series)" authored by Joseph V. Hajnal, Derek L. G. Hill, and David J. Hawkes and published by CRC Press in 2001 presents a plurality of registration methods used in processing medical images. In particular, several nonrigid registration methods described in chapter 13 may be suitable for use in the processing of step S207. By using any one of these nonrigid registration methods, the basic schema can be modified in step S207.

In step S208, the CPU 100 copies an image within a region of interest (ROI) from the medical image to the work area of the main memory 101 and generates an ROI image. For example, the region of interest may be determined by displaying the medical image on the monitor 104 and prompting the doctor to draw a rectangular or oval border on the medical image. Thus, the area within the border may be defined as the region of interest. Alternatively, as described in step S204, if the shape, size, and distribution of brightness of the affected area are already known to some extent, the affected area can be extracted automatically. Then, by setting a margin of predetermined width around the automatically extracted affected area and calculating the minimum rectangular or circular region including the affected area and the margin therearound, an ROI image can be extracted automatically.

An example of the region of interest extracted as described above is illustrated in FIG. 5. A region 502 is an example of the region of interest including the affected area in the medical image.

Referring back to FIG. 2, the description of the flowchart is continued. In step S208, the image resolution of the basic schema modified in step S207 is compared with the image resolution of the ROI image. If there is a significant difference between these image resolutions, the resolution conversion of the ROI image or modified basic schema is performed so that these resolutions become substantially the same. For example, if the image resolution of the ROI image is about n times higher than that of the modified basic schema both vertically and horizontally, the resolution of the ROI image may be reduced to 1/n that of the original ROI image both vertically and horizontally, so that the amount of data of the ROI image can be reduced to $1/n^2$ that of the original ROI image. Thus, the amount of data of a composite schema (described below), and the amount of data of the medical image to which the composite schema is written, can be reduced. Therefore, the amount of space used in the medical document database 2 can be reduced.

In step S209, the CPU 100 superimposes the ROI image obtained in step S208 on the basic schema modified in step S207. By referring to the geometric correspondence obtained in step S206 and the amount by which the basic schema is modified in step S207, the position at which the ROI image is to be superimposed on the modified basic schema can be determined. Thus, composite image data is generated.

Figure 6:
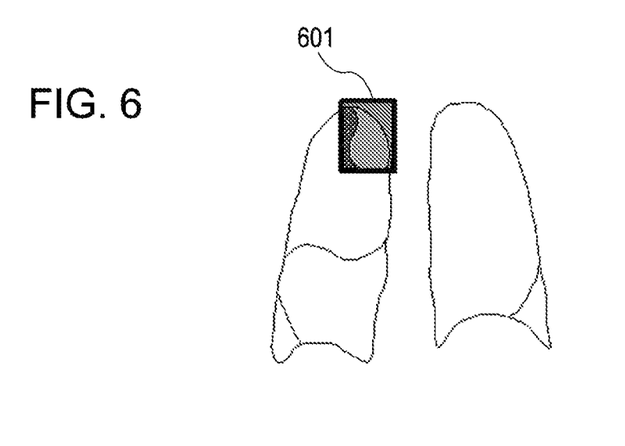
FIG. 6 illustrates an example of a composite schema generated in accordance with the first exemplary embodiment.

FIG. 6 illustrates a composite schema. In this example, a basic schema representing the front of lungs is partially replaced with an ROI image 601.

Referring back to FIG. 2, the description of the flowchart is continued. In step S210, the CPU 100 writes the composite schema at a predetermined position (hereinafter referred to as a schema description field) in the medical document stored in the main memory 101. After completion of editing of the medical document, the CPU 100 transmits the medical document to the medical document database 2 via the common bus 107 and LAN 4. The received medical document is stored in the medical document database 2.

With the configuration described above, the following effect can be achieved. That is, by viewing the composite schema in the medical document, the doctor may be capable of fully understanding the positional relationship between the body part and the affected area and, at the same time, can obtain detailed information about the affected area from the ROI image included in the composite schema. It may be possible to superimpose a medical image on a basic schema to form a single image without the configuration described above. However, when this image is simply superimposed on one another, the resulting image may be distorted in the boundary portion due to the shape of an anatomic structure unique to the patient, or a difference in size between the medical image and the basic schema, and thus the superimposed images may be unusable. On the other hand, the configuration described above as the first exemplary embodiment provides a mechanism for presenting detailed information about an affected area while maintaining the advantage of a schema in that a positional relationship between a body part and the affected area can be clearly presented to the doctor.

A second exemplary embodiment of the present invention will now be described. A configuration of the second exemplary embodiment will not be described here, as it is the same as that of the first exemplary embodiment illustrated in FIG. 1.

With reference to flowcharts of FIG. 7 to FIG. 10, a description will be given as to an example of how the control unit 10 may control the medical support apparatus 1. In the following description, steps similar to those in the flowchart of FIG. 2 in the first exemplary embodiment will be mentioned, but will not be described in detail.

Figure 7:
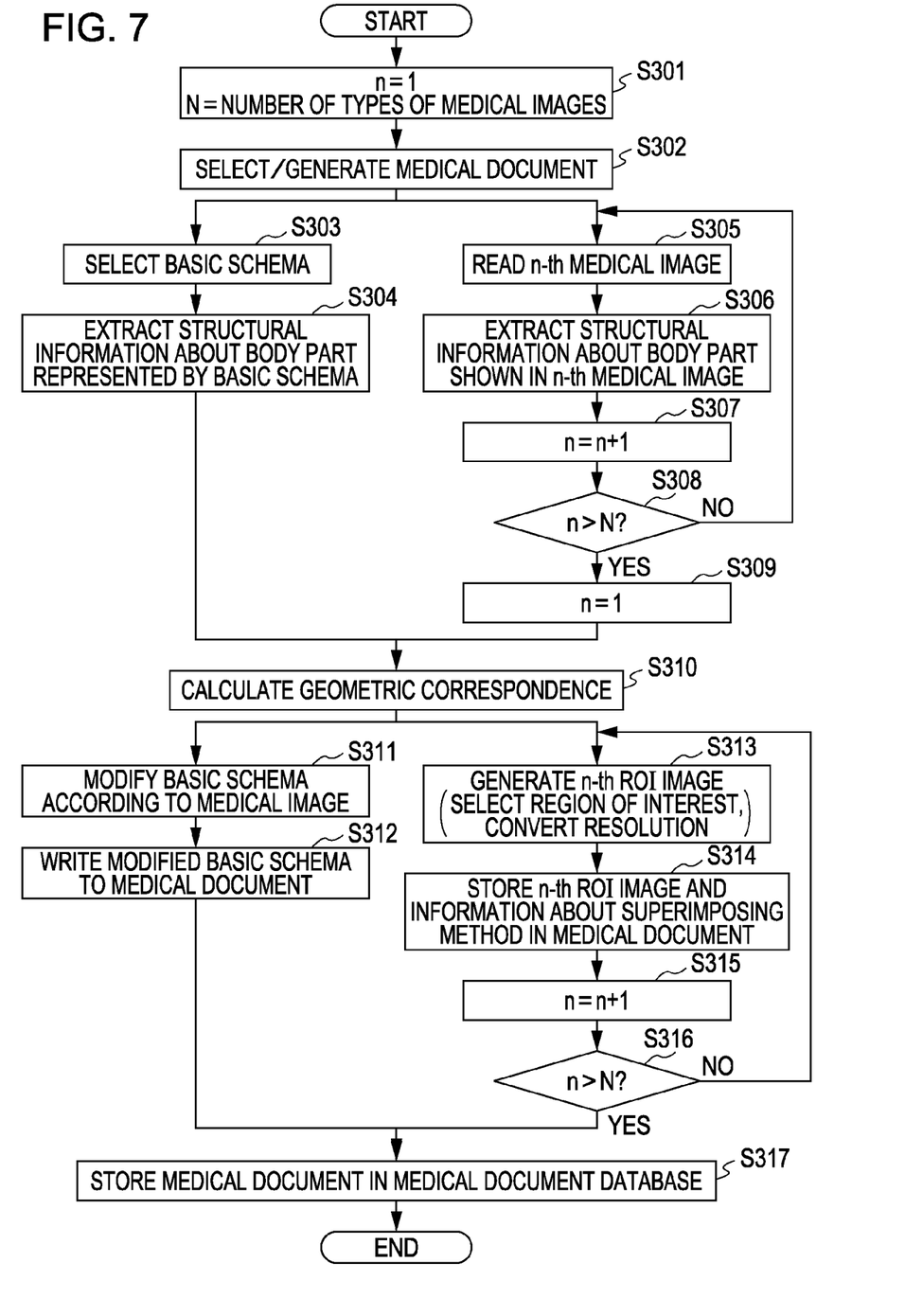
FIG. 7 is a flowchart illustrating an example of a processing procedure in which a basic schema is associated with n types of region of interest (ROI) images and written to a medical document in a second exemplary embodiment of the present invention.

FIG. 7 is a flowchart illustrating a processing procedure in which a basic schema is associated with n types of ROI images and written to a medical document. As in the case of the first exemplary embodiment, the processing illustrated in the flowchart of FIG. 7 may be realized when the CPU 100 executes a program stored in the main memory 101.

In step S301, the CPU 100 initializes variables n and N stored in the main memory 101. A value of 1 is assigned to the variable n, while the number of types of medical images is assigned to the variable N. In the present exemplary embodiment, a plurality of different types of medical images are taken for the same patient in advance, and all the plurality of medical images are sequentially associated with the medical document for this patient. The phrase "a plurality of different types of medical images" refers to any one of or combination of the following:

1. medical images taken by a plurality of different types of medical image taking apparatuses;
2. medical images taken using a plurality of different types of image taking parameters;
3. medical images taken at a plurality of different times of year, at different times of day, or in different time phases after injection of contrast agent; and
4. medical images sequentially taken as a moving image.

For example, if three types of images, that is, a CT image, an MRI image, and a PET image have been taken for the same patient, a value of 3 is assigned to N. For example, if the fifth CT image taking has been performed for a patient for which CT image taking was performed four times in the past, a value of 5 is assigned to N. Alternatively, the doctor may directly select medical images used for generating a composite schema. In this case, the number of medical images selected by the doctor is assigned to N.

In step S302, the CPU 100 performs processing similar to that performed in step S201 of FIG. 2. That is, the CPU 100 selects a medical document or generates a new medical document in step S302.

In step S303, the CPU 100 performs processing similar to that performed in step S202 of FIG. 2. That is, the CPU 100 selects a basic schema in step S303.

In step S304, the CPU 100 performs processing similar to that performed in step S203 of FIG. 2. That is, the CPU 100 extracts structural information about a body part represented by the basic schema in step S304.

In step S305, on the n-th medical image, the CPU 100 performs processing similar to that performed in step S204 of FIG. 2. That is, the CPU 100 writes to the main memory 101 a medical image associated in the n-th order with the medical document. If the doctor has directly selected medical images used for generating a composite schema, the CPU 100 writes to the main memory 101 a medical image selected in the n-th order by the doctor.

In step S306, on the n-th medical image, the CPU 100 performs processing similar to that performed in step S205 of FIG. 2. That is, the CPU 100 extracts structural information about a body part shown in the n-th medical image.

In step S307, the CPU 100 adds 1 to n.

In step S308, the CPU 100 determines whether n exceeds N. If n exceeds N (YES in step S308), the processing proceeds to step S309 and the CPU 100 assigns a value of 1 to n. If n does not exceed N (NO in step S308), the processing returns to step S305 and the CPU 100 performs processing on the next medical image.

In step S310, the CPU 100 performs processing similar to that performed in step S206 of FIG. 2. That is, the CPU 100 compares the structural information extracted in step S304 with the structural information extracted in step S306 to calculate a geometric correspondence therebetween. Specifically, in step S310, the CPU 100 compares the structural information about the body part represented by the basic schema with the structural information about the body part shown in the first medical image to calculate a geometric correspondence therebetween. Although there are n different types of medical images, the present exemplary embodiment is based on the premise that there is a clear correspondence between items of structural information about body parts shown in the different types of medical images. That is, the present exemplary embodiment is based on the premise that even when there are three different types of medical images, a CT image, an MRI image, and a PET image, these images match in terms of body part shown, cross section, and orientation, and thus there is a clear correspondence between corresponding feature points. In this case, since all the n types of images are placed at the same position on the composite schema, the geometric correspondence can be calculated using only one type of medical image.

In step S311, the CPU 100 performs processing similar to that performed in step S207 of FIG. 2. That is, the CPU 100 modifies the basic schema on the basis of the geometric correspondence obtained in step S310.

In step S312, the CPU 100 writes data of the modified basic schema to a schema description field. At this point, the medical document is stored in the main memory 101. Additionally, a position at which the writing of the data to the medical document is completed is stored so that the stored position can be subsequently used as a starting position at which writing of additional data to the medical document starts.

In step S313, the CPU 100 performs processing similar to that performed in step S208 of FIG. 2. That is, the CPU 100 generates the n-th ROI image from the selected n-th cross-sectional image.

In step S314, the CPU 100 adds, to the medical document, the n-th ROI image and information about a superimposing method. Here, the information about the superimposing method refers to information indicating that the current ROI image is the n-th ROI image, and information as to where to superimpose the ROI image on the basic schema modified in step S311. By referring to the geometric correspondence obtained in step S310 and the amount by which the basic schema is modified in step S311, a calculation can be made as to where to superimpose the ROI image on the modified basic schema. The information as to where to superimpose the ROI image on the modified basic schema may only need to be written once when n is 1 (n=1).

In step S315, the CPU 100 adds 1 to n.

In step S316, the CPU 100 determines whether n exceeds N. If n exceeds N (YES in step S316), the processing proceeds to step S317. If n does not exceed N (NO in step S316), the processing returns to step S313 and the CPU 100 performs processing on the next medical image.

In step S317, the CPU 100 transmits the medical document stored in the main memory 101 to the medical document database 2 via the common bus 107 and LAN 4. The received medical document is stored in the medical document database 2.

Figure 8:
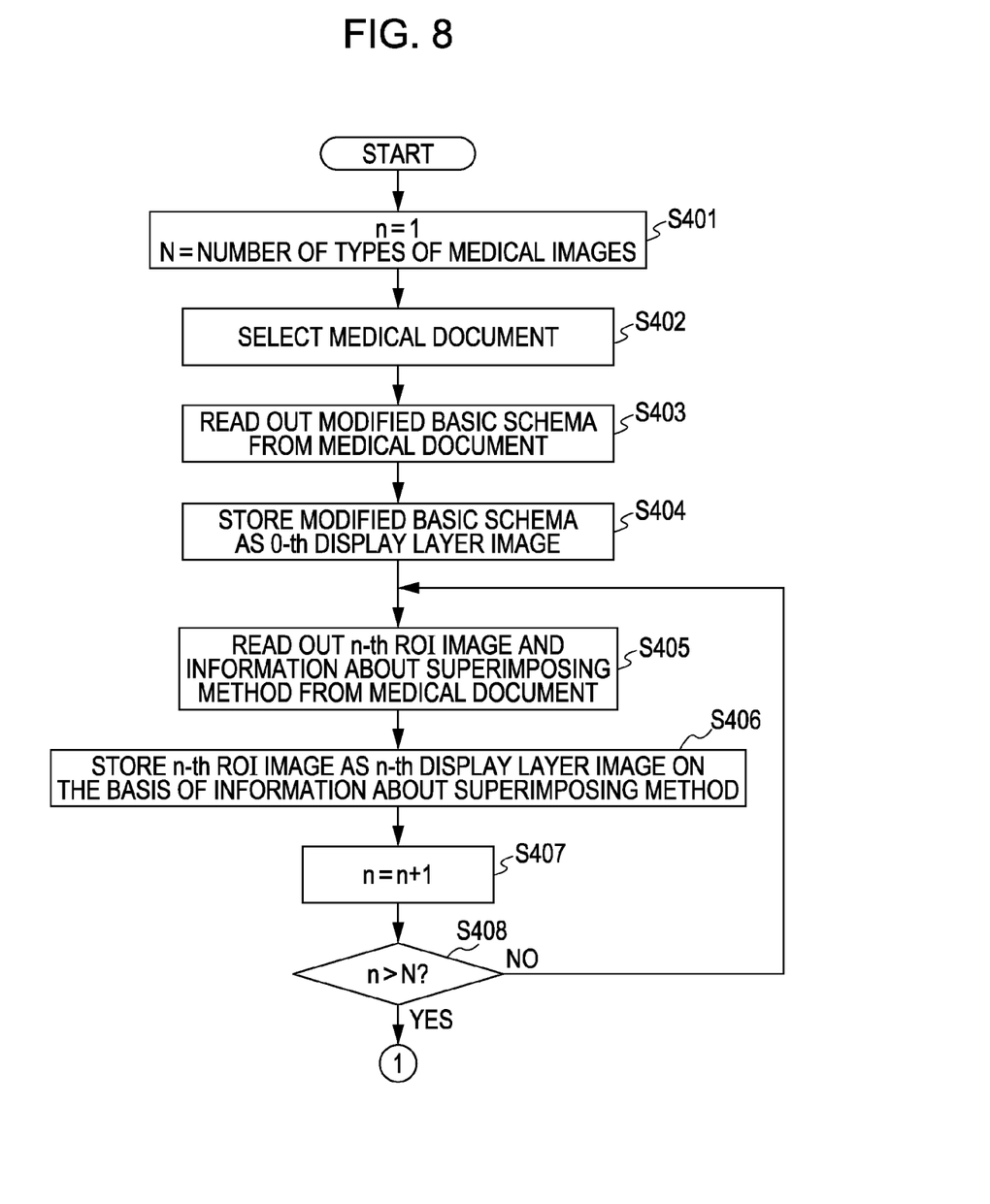
FIG. 8 is a flowchart illustrating an example of a processing procedure in which the basic schema and information about the n types of ROI images are read out of the medical document generated by the processing of FIG. 7 in the second exemplary embodiment.

FIG. 8 is a flowchart illustrating an example of a processing procedure in which the basic schema and information about the n types of ROI images are read out of the medical document generated by the processing of FIG. 7. The processing example illustrated in the flowchart of FIG. 8 may be realized when the CPU 100 executes a program stored in the main memory 101.

In step S401, as in the case of step S301 of FIG. 7, the CPU 100 initializes variables n and N stored in the main memory 101. A value of 1 is assigned to the variable n, while the number of types of medical images is assigned to the variable N.

In step S402, the CPU 100 selects a medical document, as in the case of step S302 of FIG. 7. The medical document selected here is the one generated by the processing of FIG. 7. If any of the other medical documents are selected, it may be necessary to separately perform exception handling. For ease of explanation, such exception handling in the processing of FIG. 8 will not be described here.

In step S403, the CPU 100 reads out the data of the modified basic schema from the schema description field. Additionally, a position at which the reading of the data from the medical document is completed is stored so that the stored position can be subsequently used as a starting position at which reading of data from the medical document starts.

In step S404, the CPU 100 stores the modified basic schema, in the main memory 101, as the 0-th display layer image.

In step S405, the CPU 100 reads out, from the medical document, the n-th ROI image and the information about the superimposing method. The information about the superimposing method is the information mentioned in step S314 of FIG. 7. That is, the information about the superimposing method refers to information indicating that the current ROI image is the n-th ROI image and information as to where to superimpose the ROI image on the modified basic schema.

In step S406, on the basis of the information about the superimposing method, the CPU 100 stores the n-th ROI image, in the main memory 101, as the n-th display layer image. Here, the information about the superimposing method is used to determine the superimposing position (offset) of the n-th display layer image relative to the 0-th display layer image.

In step S407, the CPU 100 adds 1 to n.

In step S408, the CPU 100 determines whether n exceeds N. If n does not exceed N (NO in step S408), the processing returns to step S405 and the CPU 100 performs processing on the next ROI image. If n exceeds N (YES in step S408), the processing proceeds to the next step indicated by "1". The processing that follows the step indicated by "1" will be described with reference to FIG. 9 and FIG. 10.

Figure 9:
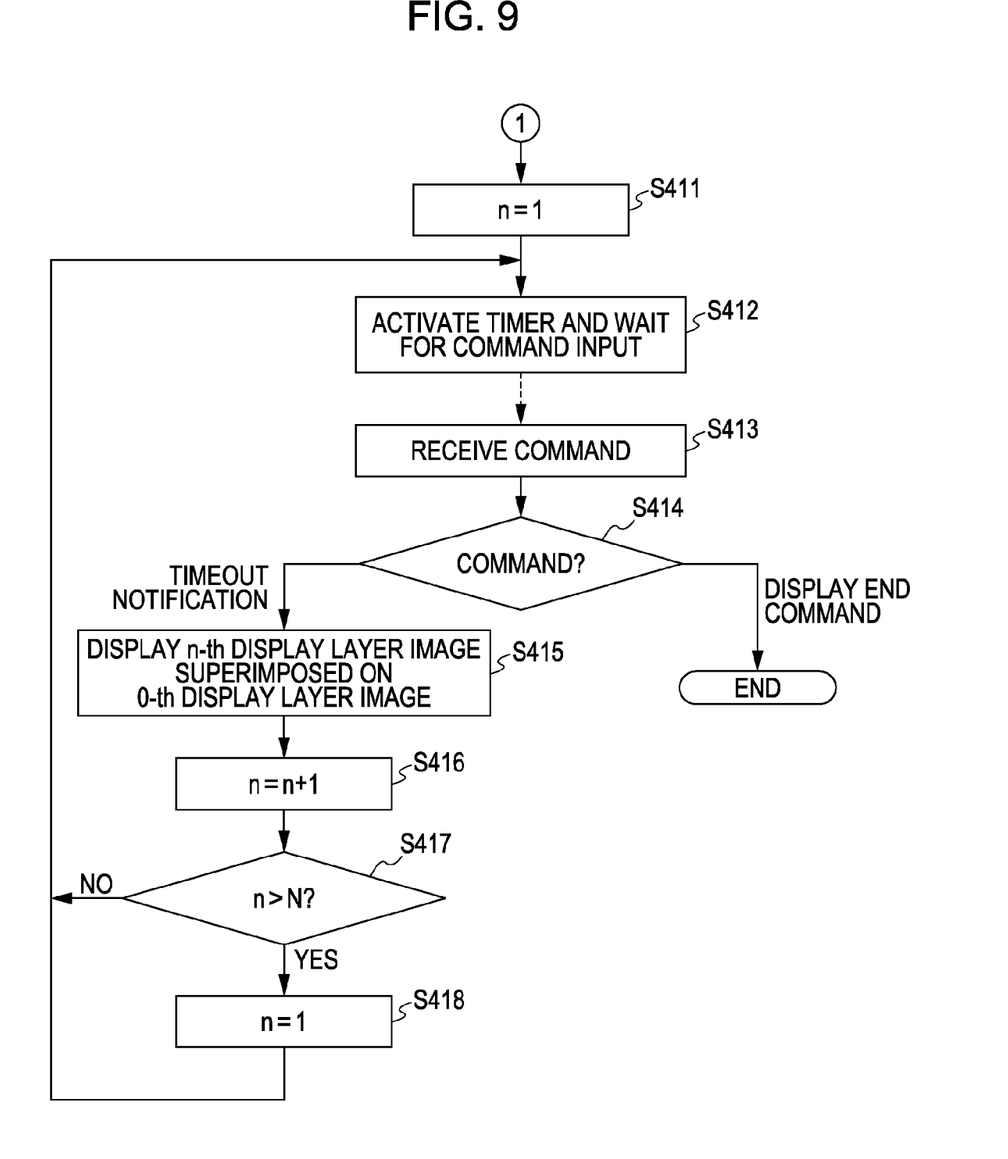
FIG. 9 is a flowchart illustrating an example of first processing that follows the processing of FIG. 8 in the second exemplary embodiment, that is, illustrating an example of a processing procedure for automatically changing a way of displaying a composite schema after an elapse of a predetermined period of time.

FIG. 9 is a flowchart illustrating an example of first processing that follows "1" of FIG. 8. FIG. 9 illustrates an example of a processing procedure for automatically changing a way of displaying a composite schema after an elapse of a predetermined period of time. The processing illustrated by this flowchart may be realized when the CPU 100 executes a program stored in the main memory 101.

In step S411, the CPU 100 assigns a value of 1 to the variable n stored in the main memory 101.

In step S412, after activating a timer (system timer) in the OS, the CPU 100 goes into a command input waiting mode. The command input waiting mode is a mode in which any command is receivable.

In step S413, the CPU 100 receives a timeout notification from the OS or a command input by the doctor or user.

In step S414, the CPU 100 determines the content of the received command and executes processing accordingly. If the received command is a timeout notification (TIMEOUT NOTIFICATION in step S414), the processing proceeds to step S415. If the received command is a display end command (DISPLAY END COMMAND in step S414), the processing of FIG. 9 is terminated.

In step S415, the CPU 100 copies the 0-th display layer image in the main memory 101 to a predetermined position (e.g., composite schema display position) in the display memory 103. Additionally, the CPU 100 overwrites, with the n-the layer display image in the main memory 101, the display memory 103 at a predetermined position (i.e., position displaced by an offset from the composite schema display position). Here, a composite image generated in the display memory 103 is a composite schema generated by superimposing the n-th ROI image on the modified basic schema.

In step S416, the CPU 100 adds 1 to n.

In step S417, the CPU 100 determines whether n exceeds N. If n exceeds N (YES in step S417), the processing proceeds to step S418. If n does not exceed N (NO in step S417), the processing returns to step S412.

In step S418, the CPU 100 assigns a value of 1 to n. Then, the processing returns to step S412.

Thus, composite schemata generated by sequentially superimposing the n-th ROI images on the modified basic schema, where n ranges from 1 to N, may be automatically displayed at predetermined time intervals.

Figure 10:
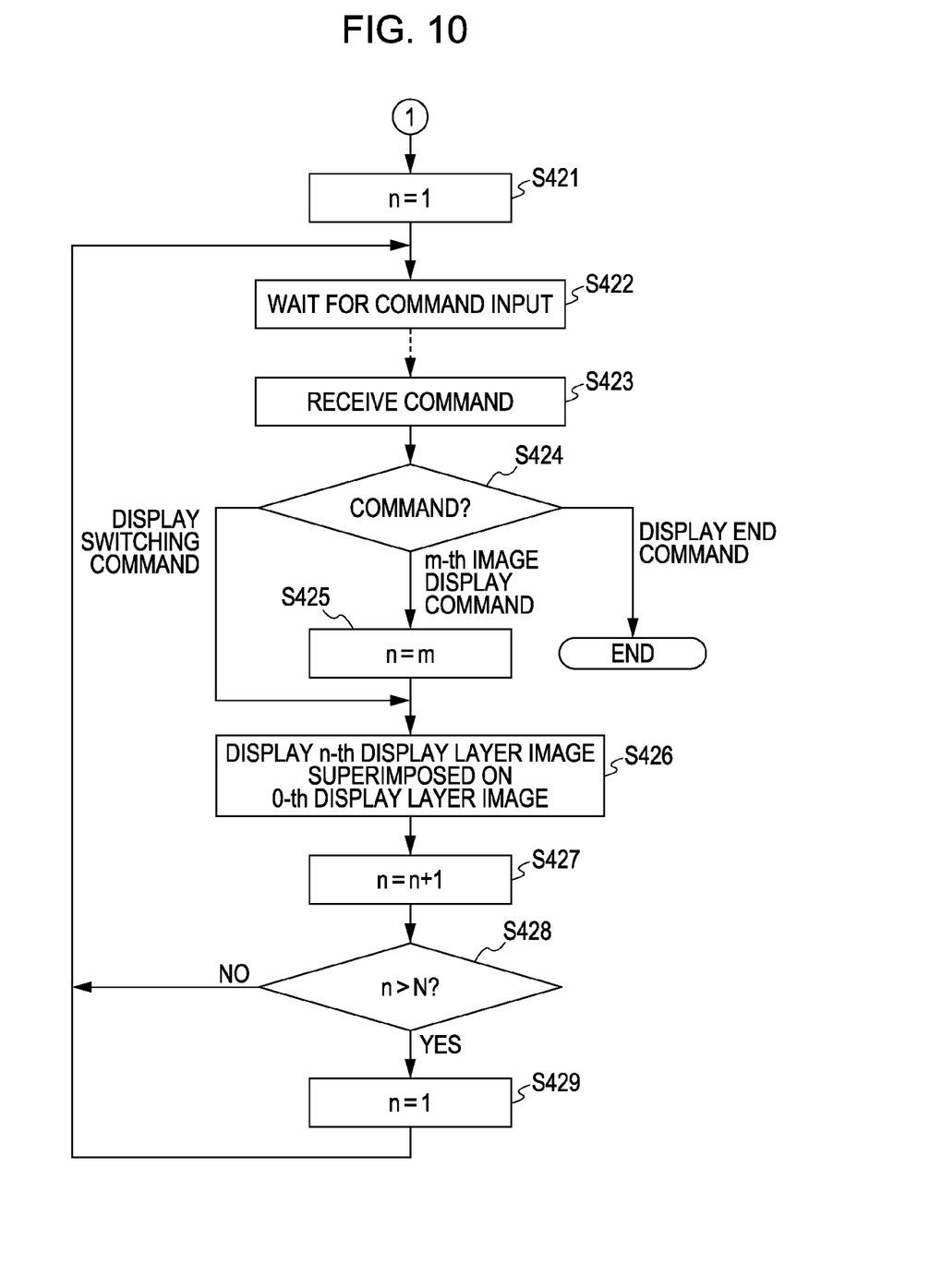
FIG. 10 is a flowchart illustrating an example of second processing that follows the processing of FIG. 8 in the second exemplary embodiment, that is, illustrating an example of a processing procedure for changing a way of displaying a composite schema in response to a command input by a doctor.

FIG. 10 is a flowchart illustrating an example of second processing that follows "1" of FIG. 8. FIG. 10 illustrates an example of a processing procedure for changing a way of displaying a composite schema in response to a command input by the doctor. As in the case of the first exemplary embodiment, the processing illustrated by this flowchart is realized when the CPU 100 executes a program stored in the main memory 101.

In step S421, the CPU 100 assigns a value of 1 to the variable n stored in the main memory 101.

In step S422, the CPU 100 goes into a command input waiting mode.

In step S423, the CPU 100 receives a command input by the doctor or user. Here, the CPU 100 receives any one of a composite-schema display switching command, the m-th image display command, and a display end command. The composite-schema display switching command is a command for changing a currently displayed composite schema to a composite schema using the next ROI image. The m-th image display command is a command for changing a currently displayed composite schema to a composite schema using the m-th ROI image.

In step S424, the CPU 100 determines the content of the received command and executes processing accordingly. If the received command is the composite-schema display switching command (DISPLAY SWITCHING COMMAND in step S424), the processing proceeds to step S426. If the received command is the m-th image display command (m-th IMAGE DISPLAY COMMAND in step S424), the processing proceeds to step S425. If the received command is the display end command (DISPLAY END COMMAND in step S424), the processing of FIG. 10 is terminated.

In step S425, the CPU 100 assigns a value of m to the variable n.

In step S426, the CPU 100 copies the 0-th display layer image in the main memory 101 to a predetermined position (composite schema display position) in the display memory 103. Additionally, the CPU 100 overwrites, with the n-the layer display image in the main memory 101, the display memory 103 at a predetermined position (i.e., position displaced by an offset from the composite schema display position). Here, a composite image generated in the display memory 103 is a composite schema generated by superimposing the n-th ROI image on the modified basic schema.

In step S427, the CPU 100 adds 1 to n.

In step S428, the CPU 100 determines whether n exceeds N. If n exceeds N (YES in step S428), the processing proceeds to step S429. If n does not exceed N (NO in step S428), the processing returns to step S422.

In step S429, the CPU 100 assigns a value of 1 to n. Then, the processing returns to step S422.

Thus, a composite schema including an ROI image selected in accordance with a command input by the doctor or user can be displayed.

With the configuration described above, the following effect can be achieved. That is, on the medical document, the displayed composite schema can be changed from one to another automatically at predetermined time intervals or in accordance with a switching request. Thus, the doctor may be able to fully understand the positional relationship between the body part and the affected area. At the same time, the doctor can view various types of ROI images included in various types of composite schemata, and thus can obtain more detailed information about the affected area.

The exemplary embodiments of the present invention have been described above in detail. The present invention can comprise at least one of a system, an apparatus, a method, a program, a storage medium, and the like. For example, the present invention may comprise a system constituted by a plurality of devices or an apparatus constituted by a single device.

Aspects of the present invention include the case where a software program having computer-executable instructions is directly or remotely supplied to a system or an apparatus, and a computer of the system or apparatus reads out and executes the instructions of the supplied program code to achieve the functions of the exemplary embodiments described above. For example, in this case, the supplied program may be a computer program stored on a computer readable storage medium, and corresponding to the illustrated flowcharts of the exemplary embodiments described above.

Therefore, the program code having the computer-executable instructions installed in the computer for realizing aspects of the functional processing of the present invention on the computer may also realize the present invention. That is, the present invention may also include a storage medium containing the computer program having computer-executable instructions for realizing aspects of the functional processing according to the present invention.

The form of a computer program having the computer-executable instructions is not particularly limited, as long as it serves as a program. For example, the computer program may comprise object code, a program executed by an interpreter, or script data supplied to the OS.

Examples of a computer-readable storage medium for supplying the computer program may include, but are not limited to, a floppy disk, a hard disk, an optical disk, an MO disk, a CD read-only memory (CD-ROM), a CD-recordable (CD-R), a CD-rewritable (CD-RW), a magnetic tape, a non-volatile memory card, a ROM, and a DVD (DVD-ROM or DVD-R).

The program having the computer-executable instructions may be supplied by connecting to a homepage on the Internet using a browser of a client computer, and downloading the computer program of the present invention from the homepage into the computer readable storage medium, such as for example a hard disk. The program to be downloaded may be a compressed file including an automatic installation function. Aspects of the present invention may also include the case where the program code having the computer-executable instructions is divided into a plurality of files, and these files are downloaded from different homepages. That is, aspects of the present invention may include a World Wide Web (WWW) server which allows a plurality of users to download program files for realizing the functional processing according to embodiments of the present invention on a computer.

The program having the computer-executable instructions according to embodiments of the present invention may be encrypted, stored in the computer readable storage medium, such as for example a CD-ROM, and distributed to users. In this case, a user who satisfies predetermined conditions may be allowed to download key information for decryption from a homepage via the Internet, execute the encrypted program using the key information, and install the program onto a computer-readable storage medium of the computer.

As described above, functions of the above-described exemplary embodiments may be realized when the computer executes the read-out program. Alternatively, in accordance with an instruction of the program, the computer may work together with the OS or the like running on the computer to realize functions of the above-described exemplary embodiments. In this case, the OS or the like may perform all or part of the actual processing, so that functions of the above-described exemplary embodiments may be realized by this processing.

Furthermore, all or part of the functions of the above-described exemplary embodiments may be realized when the program having the computer-executable instructions read out of the computer readable storage medium is written to a function expansion board inserted in the computer, or to a memory provided in a function expansion unit connected to the computer. In this case, after the program is written to the function expansion board or function expansion unit, a CPU or the like mounted on the function expansion board or function expansion unit may perform all or part of the actual processing in accordance with an instruction of the program.

While the present invention has been described with reference to exemplary embodiments, it is to be understood that the invention is not intended to be limited to the disclosed exemplary embodiments. The scope of the following claims is to be accorded the broadest interpretation so as to encompass all modifications and equivalent structures and functions.

This application claims the benefit of Japanese Application No. 2008-002615 filed Jan. 9, 2008, which is hereby incorporated by reference herein in its entirety.

What is claimed is:

1. An image processing apparatus comprising:
a selecting unit configured to select a medical image of a body part of a specific patient and a basic schema image of the body part that is not dependent on the specific patient, the selected medical image including the body part which is illustrated in the selected basic schema;
an extracting unit configured to extract information for relating the selected basic schema image and medical image;
a geometric correspondence determination unit configured to calculate a geometric correspondence between the basic schema image and the medical image based on the extracted information;
a schema modifying unit configured to modify the basic schema image based on the calculated geometric correspondence so as to relate to the medical image;
an image extracting unit configured to extract an image of a region of interest from the medical image, the extracted image being a part of the medical image, and the extracted image being smaller than the modified basic schema image; and a superimposing unit configured to generate a composite image by superimposing the extracted image on the modified basic schema image, wherein the composite image comprises the extracted image superimposed on the modified basic schema image such that the modified basic schema image is partially replaced by the extracted image, the extracted image being smaller than the modified basic schema image.

2. The image processing apparatus according to claim 1, wherein if a candidate for the medical image contains a plurality of cross-sectional images, the selecting unit selects, as the medical image, a cross-sectional image captured in the same direction as a direction in which the selected basic schema image is captured.

3. The image processing apparatus according to claim 1, wherein if a candidate for the medical image is a three-dimensional image, the selecting unit captures, from the three-dimensional image, a cross-sectional image captured in the same direction as a direction in which the selected basic schema image is captured, and selects the captured cross-sectional image as the medical image.

4. The image processing apparatus according to claim 1, further comprising a resolution converting unit configured to perform adjustment such that a resolution of the extracted image matches that of the basic schema image, wherein the superimposing unit generates the composite image on the basis of the basic schema image or the extracted image having the converted resolution.

5. The image processing apparatus according to claim 1, further comprising a display unit configured to display the composite image, wherein if the selected medical image contains a plurality of medical images, the superimposing unit generates the composite image, in response to a switching request for changing display on the display unit or in response to an elapse of a predetermined period of time, by changing any one of a plurality of extracted images which are extracted by the image extracting unit from the plurality of medical images and superimposing the resulting image on the modified basic schema image; and the display unit displays the composite image generated in response to the switching request or the elapse of a predetermined period of time.

6. The image processing apparatus according to claim 1, wherein the medical image is at least one of a plain X-ray image, an X-ray computerized tomography image, a magnetic resonance imaging image, a positron emission tomography image, a single photon emission computed tomography image, and an ultrasound image.

7. The image processing apparatus according to claim 1, wherein the basic schema image is a diagram representing a structure of a predetermined part of a human body.

8. The image processing apparatus according to claim 1, further comprising:

a display controlling unit configured to display information on a display unit, wherein the selecting unit selects a plurality of medical images, wherein the image extracting unit extracts an image of a region of interest from each of the plurality of medical images, wherein the superimposing unit superimposes the plurality of images of a region of interest on the modified basic schema image, and wherein the display controlling unit sequentially displays the plurality of images of a region of interest displayed on the modified basic schema image as the composite image.

9. The image processing apparatus according to claim 1, wherein the image extracting unit extracts information for correlating a selected basis schema image with one of a medical image within a plurality of medical images, and wherein the geometric correspondence determination unit calculates a geometric correspondence between the basic schema image and the one of the medical image within the plurality of medical images.

10. An image processing method comprising:

selecting a medical image of a body part of a specific patient and a basic schema image of the body part that is not dependent on the specific patient, the selected medical image including the body part which is illustrated in the selected basic schema image;

extracting information for relating the selected basic schema image and medical image;

calculating a geometric correspondence between the basic schema image and the medical image based on the extracted information;

modifying the basic schema image based on the calculated geometric correspondence so as to relate to the medical image;

extracting an image of a region of interest from the medical image, the extracted image being a part of the medical image, and the extracted image being smaller than the modified basic schema image; and generating a composite image by superimposing the extracted image on the modified basic schema image, wherein the composite image comprises the extracted image superimposed on the modified basic schema image such that the modified basic schema image is partially replaced by the extracted image, the extracted image being smaller than the modified basic schema image.

11. A non-transitory computer readable storage medium containing computer-executable instructions for controlling an image processing apparatus, the computer readable storage medium comprising:

computer-executable instructions for selecting a medical image of a body part of a specific patient and a basic schema image of the body part that is not dependent on the specific patient, the selected medical image including the body part which is illustrated in the selected basic schema image;

computer-executable instructions for extracting information for relating the selected basic schema image and medical image;

computer-executable instructions for calculating a geometric correspondence between the basic schema image and the medical image based on the extracted information;

computer-executable instructions for modifying the basic schema image based on the calculated geometric correspondence so as to relate to the medical image;

computer-executable instructions for extracting an image of a region of interest from the medical image, the extracted image being a part of the medical image, and the extracted image being smaller than the modified basic schema image; and computer-executable instructions for generating a composite image by superimposing the extracted image on the modified basic schema image, wherein the composite image comprises the extracted image superimposed on the modified basic schema image such that the modified basic schema image is partially replaced by the extracted image, the extracted image being smaller than the modified basic schema image.

* * * * *